F. H. BEROLD.
LATHE.
APPLICATION FILED MAY 13, 1910
992,843.
Patented May 23, 1911.
3 SHEETS—SHEET 1.
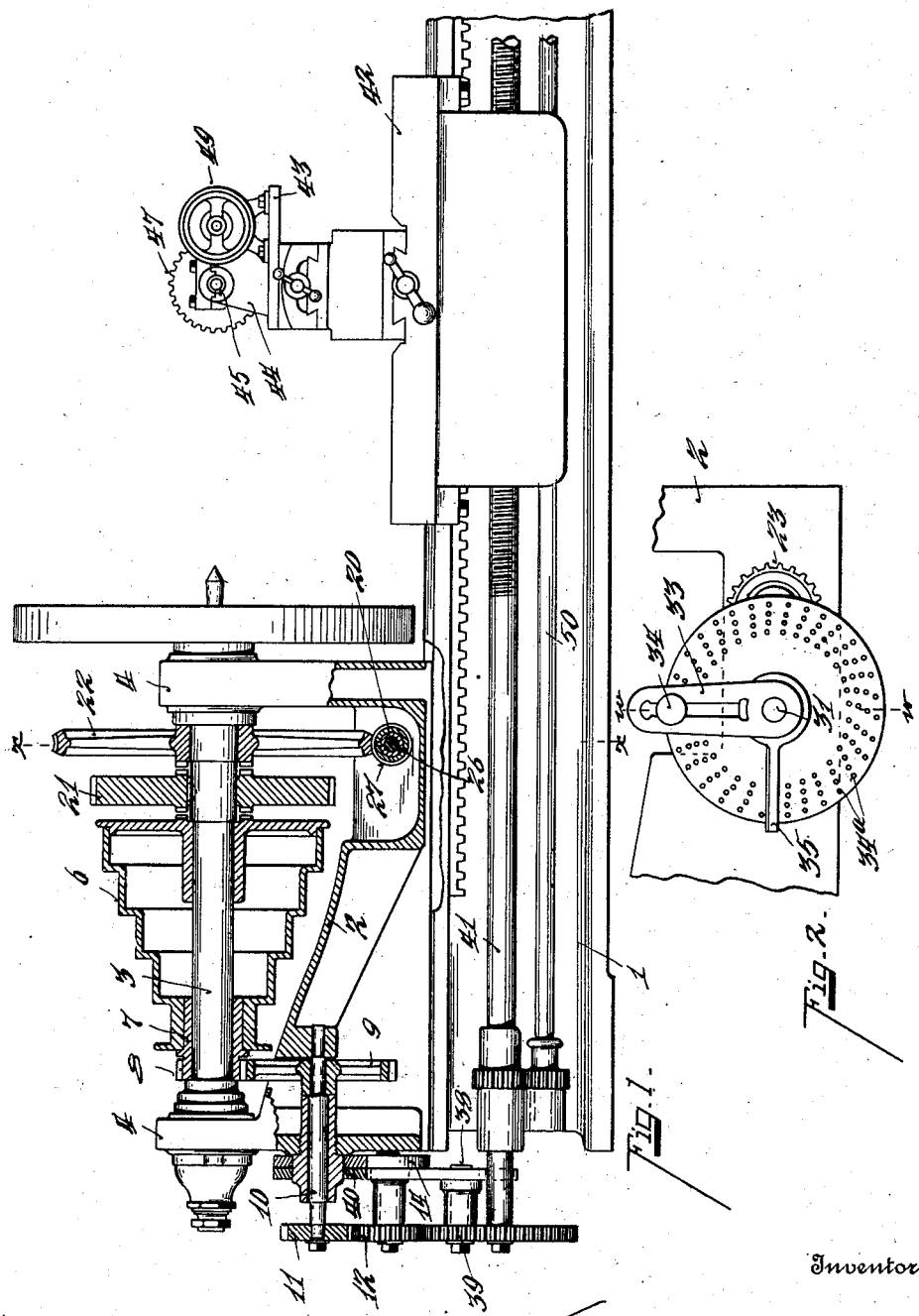

F. H. BEROLD.
LATHE.
APPLICATION FILED MAY 13, 1910.
992,843.
Patented May 23, 1911.
3 SHEETS—SHEET 2.
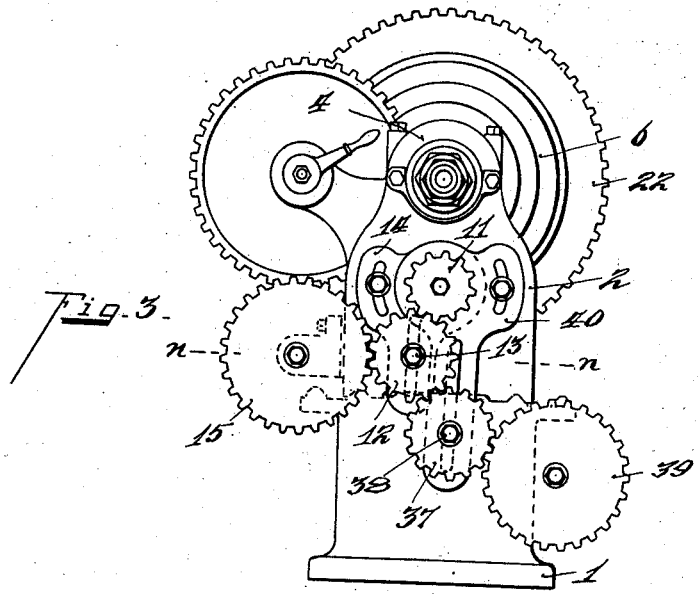
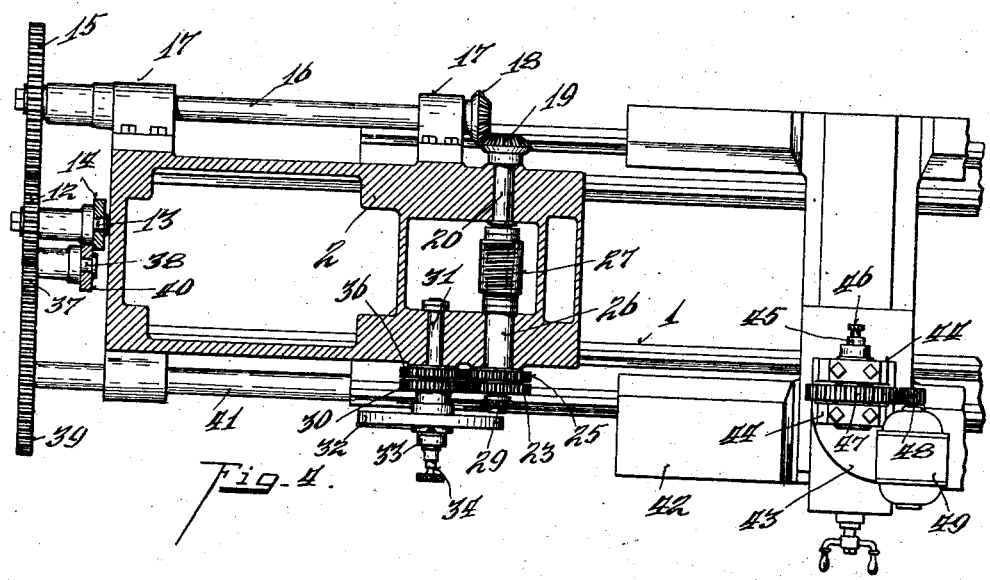

F. H. BEROLD.
LATHE.
APPLICATION FILED MAY 13, 1910.
992,843.
Patented May 23, 1911.
3 SHEETS—SHEET 3.
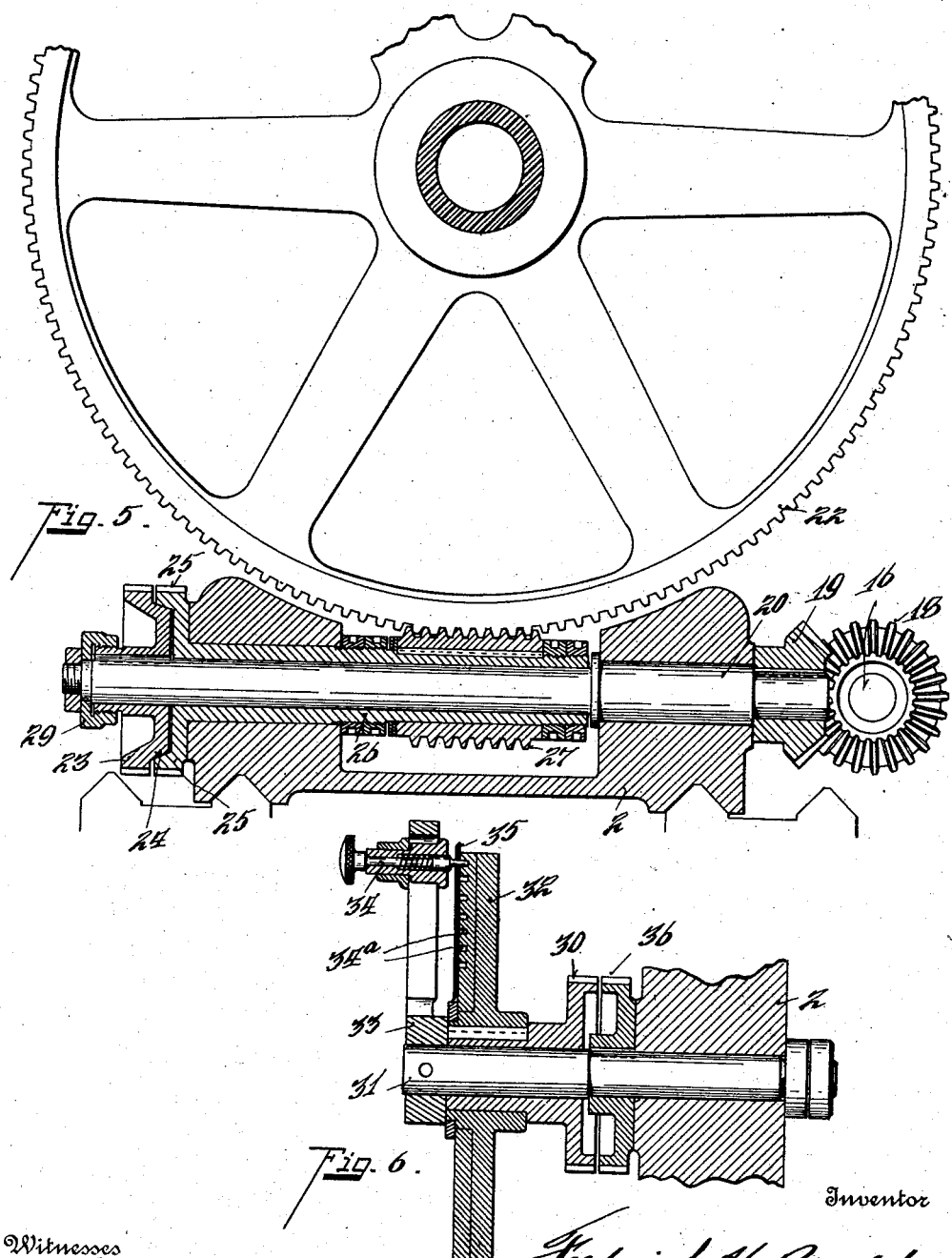

UNITED STATES PATENT OFFICE.

FREDERICK H. BEROLD, OF CINCINNATI, OHIO.

LATHE.

992,843.  Specification of Letters Patent.  Patented May 23, 1911.

Application filed May 13, 1910. Serial No. 561,256.

*To all whom it may concern:*

Be it known that I, FREDERICK H. BEROLD, a citizen of the United States, residing at Cincinnati, in the county of Hamilton and State of Ohio, have invented certain new and useful Improvements in Lathes, of which the following is a specification.

My invention relates to an improvement in lathes and primarily in means for governing the rotation of the spindle, whereby the circumference of the work can be divisionally spaced, in cutting a series of spiral grooves and the like, accomplished on a milling machine.

One of the objects of my invention is to provide a lathe head with dividing means, adapted to be thrown in train with the spindle, for performing divisional cuts around the periphery of the work.

Another object of my invention is to provide a lathe with means, whereby the same can be readily converted to do general turning and milling.

The features of my invention will be more fully set forth in the description of the accompanying drawings, forming a part of this specification, in which:—

Figure 1 is a sectional elevation of lathe, with my improvements applied. Fig. 2 is a front elevation of a portion of the head-stock and indexing mechanism. Fig. 3 is an end elevation of the lathe. Fig. 4 is a section on line $n$, $n$, Fig. 3, with top plan view of the carriage. Fig. 5 is an enlarged section on line $x$, $x$, Fig. 1, with the spindle worm wheel in elevation. Fig. 6 is an enlarged section on line $w$, $w$, Fig. 2.

With my improvement in lathes, it is possible to do general turning in finishing the periphery of the work, and without removing the same or rechucking. Divisional horizontal grooving, spirally or otherwise can be milled around the periphery. This is highly advantageous in making cylinder printing rolls and the like.

1 represents the lathe bed of conventional form.

2 represents the head-stock, and 3 the spindle journaled in the bearing 4.

6 represents a cone pulley loosely journaled upon the spindle and fixed to the sleeve 7, likewise loose on the spindle.

8 represents a gear formed on the sleeve 7, in mesh with a gear 9, fixed to an intermediate shaft 10, journaled in bearings formed in the head-stock.

11 represents a gear fixed to the shaft 10, in mesh with a change gear 12, journaled upon a stud pin 13, adjustably mounted upon the swinging quadrant 14.

15 represents a gear fixed to the shaft 16, journaled in the bearings 17, fixed to the head-stock, see Fig. 4. 18 represents a bevel gear fixed upon the opposite end of shaft 16, in mesh with a bevel gear 19, fixed upon the transverse shaft 20, for transmitting motion to the spindle dividing mechanism, hereinafter to be described more in detail.

21 represents a back gear splined upon the spindle, and as illustrated, is provided with clutch teeth upon each side of its hub, adapted to be alternately engaged with clutch teeth formed on the cone pulley 6 and the worm wheel 22, loose on the spindle, for engaging the same into driving connection with the spindle. The gears 8 and 21 may be connected through a system of back gears mounted upon a shaft, which in turn is eccentrically mounted within brackets projected from the head-stock, shown in Fig. 3. This back gearing may be of conventional type common in the art, wherein the back gear system of gearing can be thrown into and out of operation at will, but the general details of construction thereof are immaterial to the functions of this invention. Thus, by sliding gear 21 into engagement with the cone pulley, the lathe can be used in the general manner. In its intermediate position, disengaged from either the cone pulley or worm wheel 27, the back gearing may be employed, and engaging the gear 21 with the worm wheel a slow feed may be imparted to the spindle. It is obvious, however, that any form of clutching means and mechanism for producing the various spindle rotations may be employed, without departing from the features of my invention, and I therefore do not wish to be limited to any particular form of obtaining the result.

The spindle divisional indexing and its relative drive is accomplished as follows:—

23 represents a gear splined upon the shaft 20, having a tapering face 24, adapted to be frictionally clamped within a tapering recess formed within the gear 25. The gear 25 is provided with an elongated sleeve 26, loosely journaled upon the shaft 20, and 27 represents a worm fixed upon said sleeve, in mesh with the worm wheel 22, see Fig. 5, and held against lateral displacement by the lock nuts and washers. 29 represents a nut fitted upon the shaft 20, and screw threaded upon the sleeve hub of the gear 23, for frictionally clamping the gear 23, with gear 25, for providing direct driving connection between the shaft 20 and worm. 30 represents a gear in mesh with gear 23, mounted upon the stud shaft 31, see Figs. 4 and 6. 32 represents an index plate fixed to the hub of the gear 30. 33 represents a crank fixed to the stud shaft 31, provided with an indexing pin 34, adapted to be selectively engaged with the indexing holes 34ª, in the index plate 32, and 35 represents gage arms commonly employed in indexing.gage or dividing heads. 36 represent gears fixed to the stud shaft 31, in mesh with gear 25. 37 represents a gear journaled upon the stud pin 38, adjustably mounted upon the quadrant 40, see Fig. 3. Said gear 37 is in mesh with a gear 39, fixed upon the screw shaft 41, for feeding the carriage 42. The carriage feeding and driving mechanism may be of any conventional form, for providing the forward and reverse feed of the carriage upon the bed, and feeding the tool slide, and the same are not herewith illustrated. As illustrated, however, the carriage is provided with a coupon tool slide upon which is clamped a motor and cutter arbor supporting plate 43. 44 represent journal bearings projected from said plate within which is journaled the cutter arbor 45, carrying a cutter 46. 47 represents a gear fixed upon said arbor, in mesh with a pinion 48, fixed upon the motor shaft of the motor 49, the motor being suitably clamped upon the supporting plate 43.

The cutter arbor or spindle may be of any well-known form for detachably supporting rotary cutting tools, and it is also obvious, that the arbor can be driven through a system of gearing from the carriage feed shaft 50, commonly employed in lathes, instead of employing a motor drive, without departing from the features of my invention. It is also obvious, that various types of variable speed system of gearing may be employed between the gears 11 and 15, or 11 and 39, for providing the various ratios of speed required for relative rotation of the spindle with carriage feed, instead of the change gear system illustrated, without departing from the features of my invention.

Having described my invention, I claim:—

1. A combined milling and metal turning machine, comprising a conventional engine lathe organization of bed, head-stock, spindle, carriage, tool-slide and feed shaft, variable speed gear transmission mechanism for the spindle and feed shaft, for turning or screw cutting work, worm transmission mechanism for the spindle and feed shaft for milling work, and means for alternately driving through either of said transmission mechanisms.

2. A combined milling and metal turning machine, comprising a conventional engine lathe organization of bed, head-stock, spindle, carriage, tool-slide, and feed shaft, variable speed gear transmission mechanism for the spindle and feed shaft, for turning or screw cutting work, variable speed worm transmission mechanism for the spindle and feed shaft, comprising a dividing mechanism for milling work, and means for driving through either of said transmission mechanisms.

3. A convertible turning and milling machine, comprising a lathe organization of bed, head-stock, spindle, carriage, and carriage feeding means, main driving means loose on the spindle, worm driving means loose on the spindle, a system of variable speed gearing and transmission elements between said main driving means and worm, a system of variable speed gearing, and transmission elements between the main driving means and carriage feed means, means for alternately engaging said main driving means, and worm driving means in driving connection with the spindle and rotative cutter driving means mounted on and movable with the carriage.

4. A convertible turning and milling machine, comprising a lathe organization of bed, head-stock, spindle, carriage, and carriage feeding means, main driving means loose on the spindle, worm driving means loose on the spindle, a system of variable speed gearing and transmission elements between said main driving means and worm, a system of variable speed gearing and transmission elements between the main driving means and carriage feed means, means for alternately engaging said main driving means and worm driving means in driving connection with the spindle and rotative cutter, driving means mounted on and movable with the carriage, and indexing mechanism interposed with said worm driving means, providing divisional working guides to a given rotation of the spindle relative to the feed of the carriage.

In testimony whereof, I have hereunto set my hand.

FREDERICK H. BEROLD.

Witnesses:
OLIVER B. KAISER,
EMMA SPENER.